US012732242B2

(12) United States Patent
Khoshnevisan et al.

(10) Patent No.: US 12,732,242 B2
(45) Date of Patent: Sep. 8, 2026

(54) BEAM HOPPING WITHIN A SINGLE PHYSICAL UPLINK CONTROL CHANNEL RESOURCE

(71) Applicant: QUALCOMM Incorporated, San Diego, CA (US)

(72) Inventors: Mostafa Khoshnevisan, San Diego, CA (US); Xiaoxia Zhang, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/905,896

(22) PCT Filed: Mar. 9, 2020

(86) PCT No.: PCT/CN2020/078386

§ 371 (c)(1),
(2) Date: Sep. 8, 2022

(87) PCT Pub. No.: WO2021/179113

PCT Pub. Date: Sep. 16, 2021

(65) Prior Publication Data

US 2023/0170958 A1 Jun. 1, 2023

(51) Int. Cl.

| | |
|---|---|
| ***H04W 52/24*** | (2009.01) |
| ***H04B 7/06*** | (2006.01) |
| ***H04W 52/42*** | (2009.01) |

(52) U.S. Cl.

CPC ....... *H04B 7/0617* (2013.01); *H04B 7/06952* (2023.05); *H04W 52/242* (2013.01); *H04W 52/42* (2013.01)

(58) Field of Classification Search

CPC . H04B 7/0617; H04B 7/0695; H04W 52/242; H04W 52/42; H04W 52/06

See application file for complete search history.

(56) References Cited

U.S. PATENT DOCUMENTS

| | | | | |
|---|---|---|---|---|
| 2019/0268961 A1* | 8/2019 | Tsai | ...................... | H04W 16/28 |
| 2020/0053721 A1* | 2/2020 | Cheng | .................... | H04B 7/086 |

(Continued)

FOREIGN PATENT DOCUMENTS

| | | |
|---|---|---|
| CN | 110034876 A | 7/2019 |
| CN | 110393025 A | 10/2019 |

(Continued)

OTHER PUBLICATIONS

Nokia, et al., "Discussion on PUCCH Beam Management", 3GPP TSG RAN WG1 Meeting #93, R1-1807191, 3rd Generation Partnership Project, Mobile Competence Centre, 650, Route Des Lucioles, F-06921 Sophia-Antipolis Cedex, France, vol. RAN WG1, No. Busan, Korea, Apr. 21, 2018-Apr. 25, 2018, May 11, 2018, XP051462157, 2 pages, section 2.

(Continued)

*Primary Examiner* — Kevin T Bates
*Assistant Examiner* — Hector Reyes
(74) *Attorney, Agent, or Firm* — Harrity & Harrity, LLP

(57) ABSTRACT

Various aspects of the present disclosure generally relate to wireless communication. In some aspects, a user equipment (UE) may receive an activation command to activate multiple spatial relations for a single physical uplink control channel (PUCCH) resource. The UE may communicate in the single PUCCH resource using the multiple spatial relations. Numerous other aspects are provided.

30 Claims, 7 Drawing Sheets

(56) References Cited

U.S. PATENT DOCUMENTS

2020/0314664 A1* 10/2020 Zhou .................... H04B 7/0617
2021/0105726 A1* 4/2021 Yao ....................... H04W 52/10
2021/0136768 A1 5/2021 Kang et al.
2021/0144722 A1* 5/2021 Yang ................... H04W 72/046
2021/0336664 A1 10/2021 Yang et al.
2021/0377747 A1* 12/2021 Miao ..................... H04W 16/28
2022/0278776 A1* 9/2022 Ling .................... H04B 7/0404
2023/0072427 A1* 3/2023 Jung .................... H04B 7/0617
2023/0077264 A1* 3/2023 Gao ..................... H04B 7/0404
2023/0085606 A1* 3/2023 Shao ................... H04W 52/242
2023/0180243 A1* 6/2023 Chen ..................... H04L 5/0035
370/329

FOREIGN PATENT DOCUMENTS

CN 110535601 A 12/2019
CN 110536399 A 12/2019
CN 110769502 A 2/2020
EP 4101080 A1 12/2022
WO 2019171518 A1 9/2019
WO WO-2019201253 A1 10/2019
WO WO-2020020128 A1 1/2020
WO 2021156826 A1 8/2021

OTHER PUBLICATIONS

Supplementary European Search Report—EP20924067—Search Authority—The Hague—Oct. 30, 2023.
Ericsson: "On Signalling Reduction for Beam Management", 3GPP TSG-RAN WG1 Meeting #93, R1-1806220, Busan, Korea, May 21-25, 2018, May 12, 2018 (May 12, 2018) Sections 2-3, pp. 1-3.
International Search Report and Written Opinion—PCT/CN2020/078386—ISA/EPO—Dec. 8, 2020.
Qualcomm Incorporated: "Design of MIMO DL MAC CE", 3GPP Draft, 3GPP TSG-RAN WG2 Meeting #109 Electronic, R2-2001034, 3rd Generation Partnership Project (3GPP), Mobile Competence Centre, 650, Route Des Lucioles, F-06921, Sophia-Antipolis Cedex, France, vol. RAN WG2, No. Feb. 24, 2020-Mar. 6, 2020, Feb. 14, 2020 (Feb. 14, 2020), XP051849450, 10 pages, Retrieved from the Internet: URL:https://ftp.3gpp.org/tsg_ran/WG2_RL2/TSGR2_109_e/Docs/R2-2001034.zip R2-2001034_Design of MIMO DL MAC CEs_v1.docx [retrieved on Feb. 14, 2020] Sections 2-3, the Whole Document.

* cited by examiner

BEAM HOPPING WITHIN A SINGLE PHYSICAL UPLINK CONTROL CHANNEL RESOURCE

CROSS-REFERENCE TO RELATED APPLICATION

This patent application is a 371 national stage of PCT Application No. PCT/CN2020/078386 filed on Mar. 9, 2020, entitled "BEAM HOPPING WITHIN A SINGLE PHYSICAL UPLINK CONTROL CHANNEL RESOURCE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beam hopping within a single physical uplink control channel resource.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an activation command to activate multiple spatial relations for a single physical uplink control channel (PUCCH) resource; and communicating in the single PUCCH resource using the multiple spatial relations.

In some aspects, a method of wireless communication, performed by a base station (BS), may include determining multiple spatial relations that are to be activated, for a UE, in a single PUCCH resource; and transmitting an activation command to the UE to activate the multiple spatial relations for the single PUCCH resource.

In some aspects, a UE for wireless communication may include a memory and one or more processors operatively coupled to the memory. The memory and the one or more processors may be configured to receive an activation command to activate multiple spatial relations for a single PUCCH resource; and communicate in the single PUCCH resource using the multiple spatial relations.

In some aspects, a BS for wireless communication may include a memory and one or more processors operatively coupled to the memory. The memory and the one or more processors may be configured to determine multiple spatial relations that are to be activated, for a UE, in a single PUCCH resource; and transmit an activation command to the UE to activate the multiple spatial relations for the single PUCCH resource.

In some aspects, a non-transitory computer-readable medium may store one or more instructions for wireless communication. The one or more instructions, when executed by one or more processors of a UE, may cause the one or more processors to receive an activation command to activate multiple spatial relations for a single PUCCH resource; and communicate in the single PUCCH resource using the multiple spatial relations.

In some aspects, a non-transitory computer-readable medium may store one or more instructions for wireless communication. The one or more instructions, when executed by one or more processors of a BS, may cause the one or more processors to determine multiple spatial relations that are to be activated, for a UE, in a single PUCCH resource; and transmit an activation command to the UE to activate the multiple spatial relations for the single PUCCH resource.

In some aspects, an apparatus for wireless communication may include means for receiving an activation command to activate multiple spatial relations for a single PUCCH resource; and means for communicating in the single PUCCH resource using the multiple spatial relations.

In some aspects, an apparatus for wireless communication may include means for determining multiple spatial relations that are to be activated, for a UE, in a single PUCCH resource; and means for transmitting an activation command to the UE to activate the multiple spatial relations for the single PUCCH resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
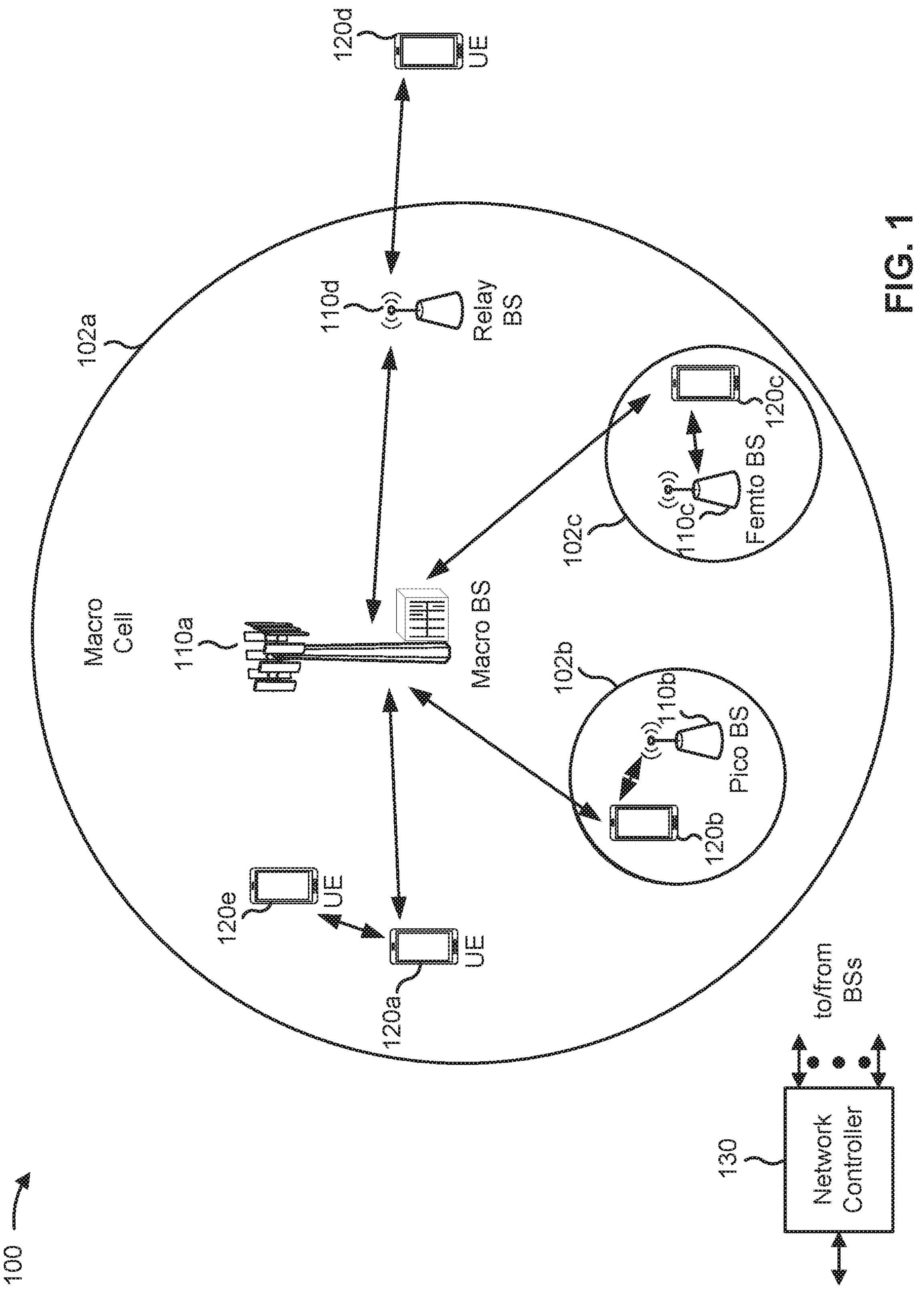
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of base stations (BSs) 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example; the processor components (e.g., one or more processors) and the memory components (e.g., a memory) may be operatively coupled, communicatively coupled, electronically. coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
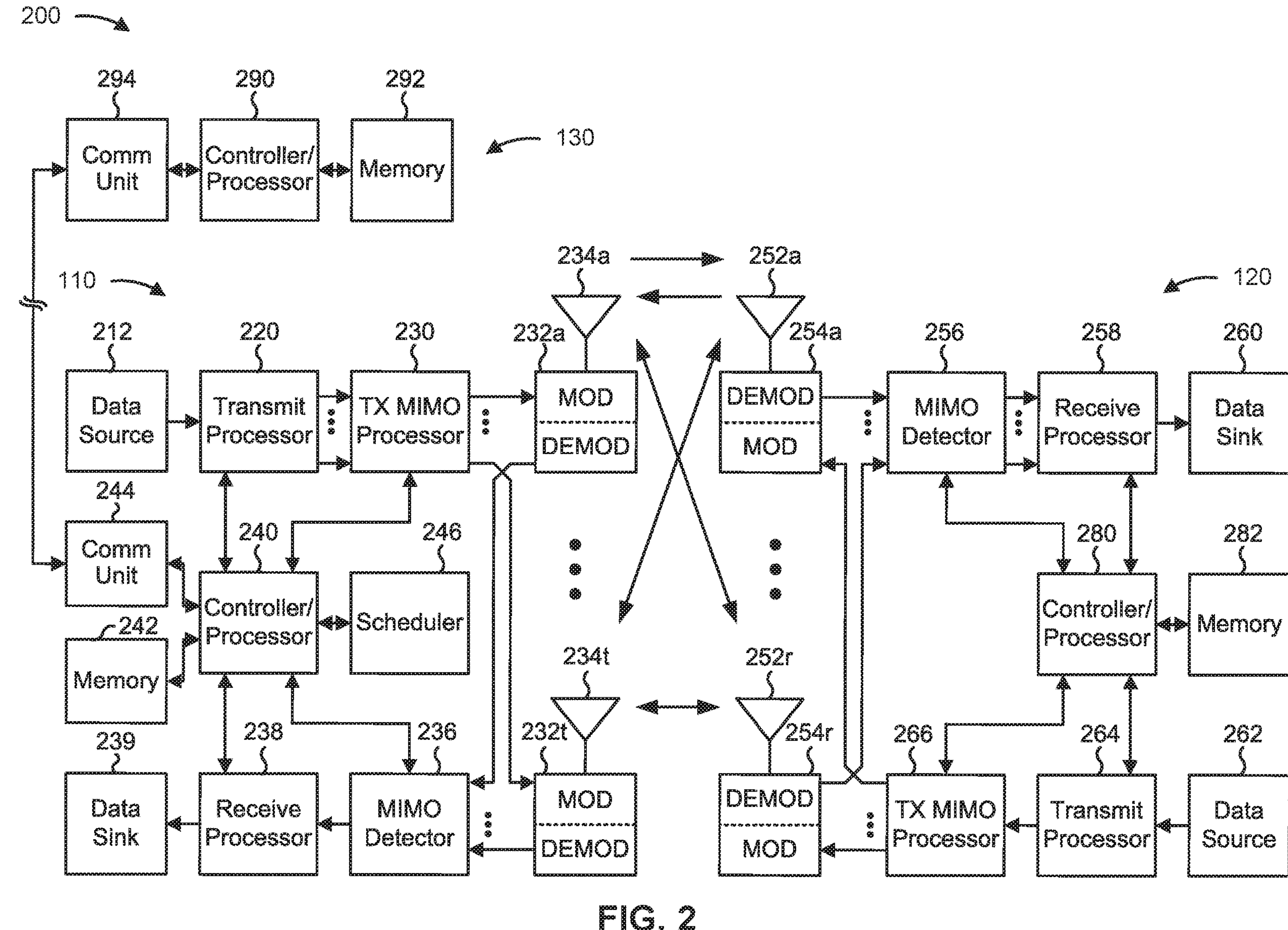
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols, Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam hopping within a single physical uplink control channel (PUCCH) resource, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving an activation command to activate multiple spatial relations for a single PUCCH resource, means for communicating in the single PUCCH resource using the multiple spatial relations, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining multiple spatial relations that are to be activated, for a UE, in a single PUCCH resource, means for transmitting an activation command to the UE to activate the multiple spatial relations for the single PUCCH resource, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Wireless communication devices, such as UEs, BSs, TRPs, and/or the like, may communicate with each other using beams. In some cases, a beam indication (e.g., a transmission configuration indication (TCI) state, a quasi-co-location (QCL) relationship, a spatial relation, and/or the like) may be separately signaled for different resources. For example, for uplink communications, a BS may indicate a set of spatial relations (e.g., a set of eight spatial relations) that are to be used for different PUCCH resources. Moreover, the BS may signal an activated spatial relation for a particular PUCCH resource. For example, the BS may signal a first activated spatial relation for a first PUCCH resource, a second activated spatial relation for a second PUCCH resource, and so forth.

In some cases, it may be beneficial for a UE to communicate using multiple beams that are to be received by different receivers (e.g., different antennas, panels, TRPs, BSs, and/or the like), thereby improving performance of the UE's communications. However, a UE may not be enabled to communicate using multiple beams in a single PUCCH resource. For example, a UE may use the same rate matching and resource mapping for the single PUCCH resource, which may impair performance and reliability of communications using multiple beams that are to be received by different receivers (e.g., when backhaul conditions between the different receivers are not ideal). Some techniques and apparatuses described herein enable a UE to communicate using multiple beams in a single PUCCH resource.

Figure 3A:
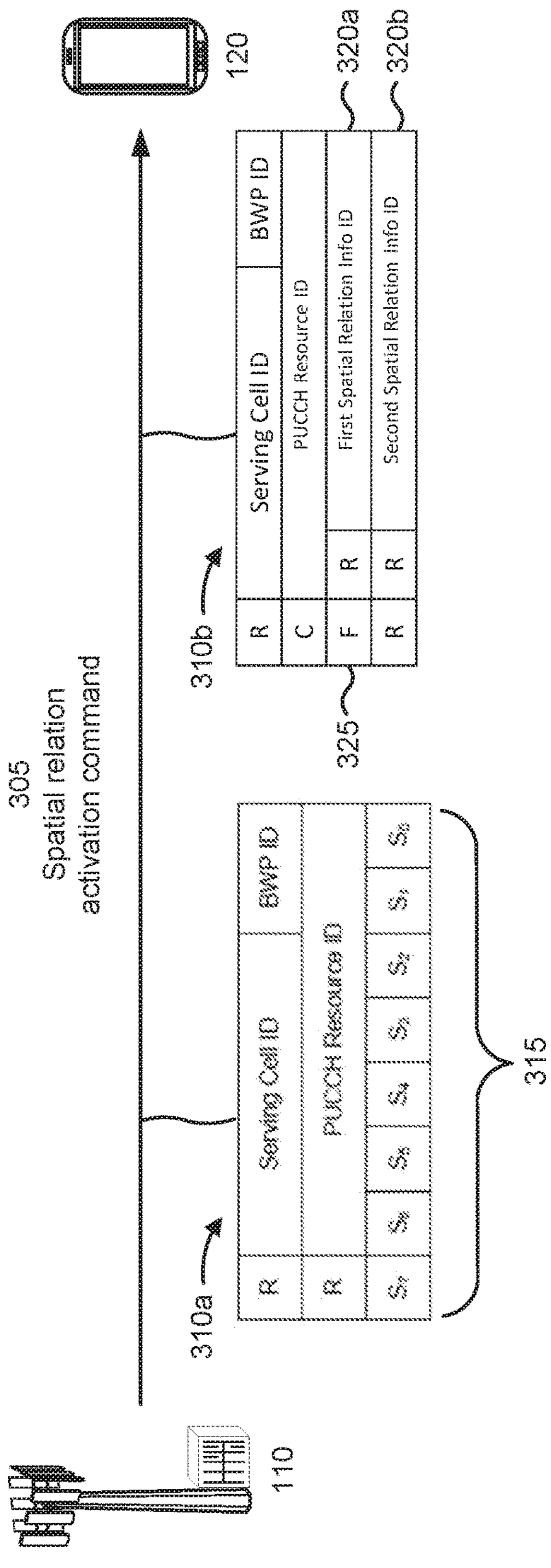
FIGS. 3A-3C are diagrams illustrating one or more examples of beam hopping within a single physical uplink control channel resource, in accordance with various aspects of the present disclosure.
Figure 3B:
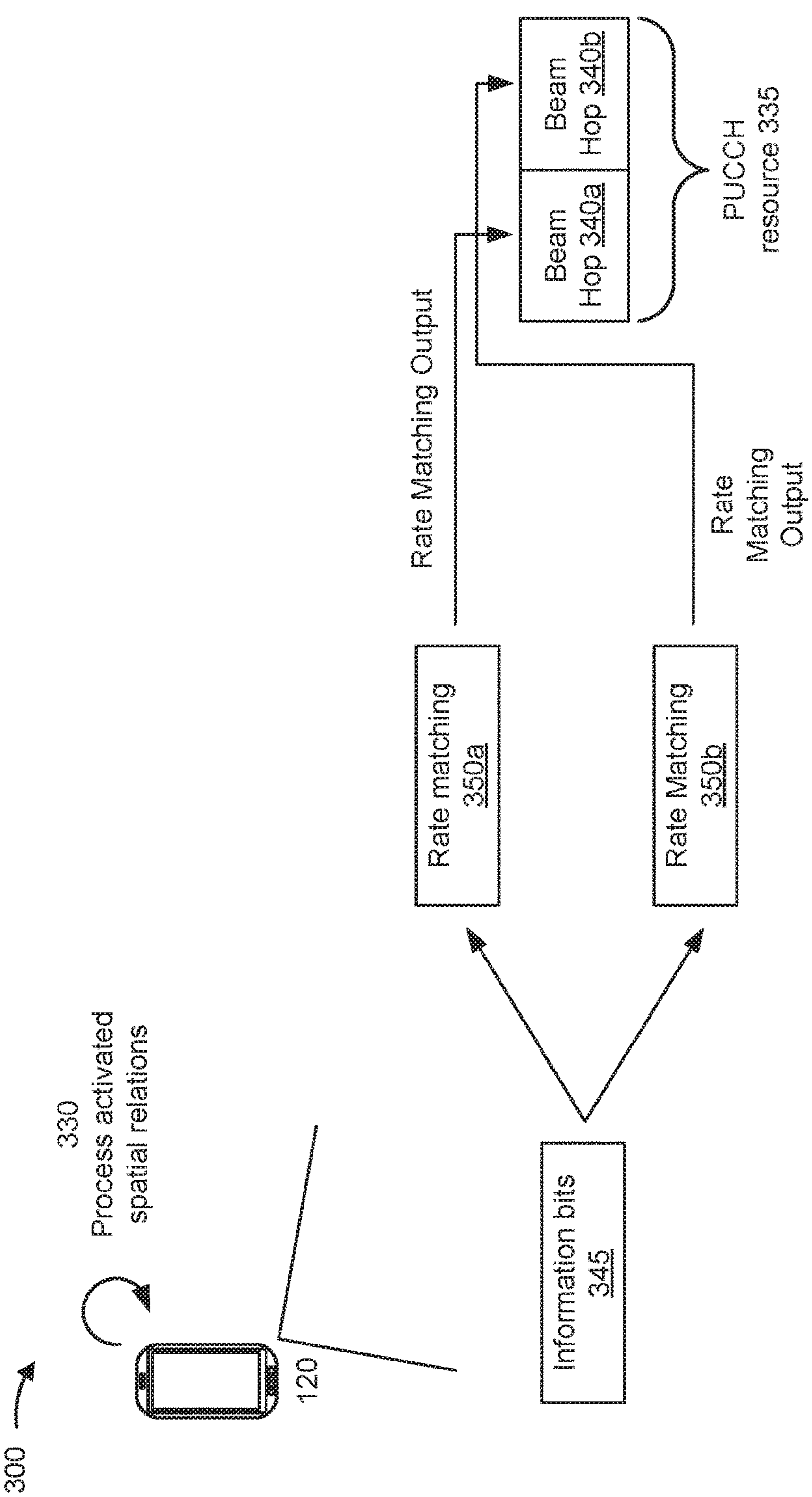
Figure 3C:
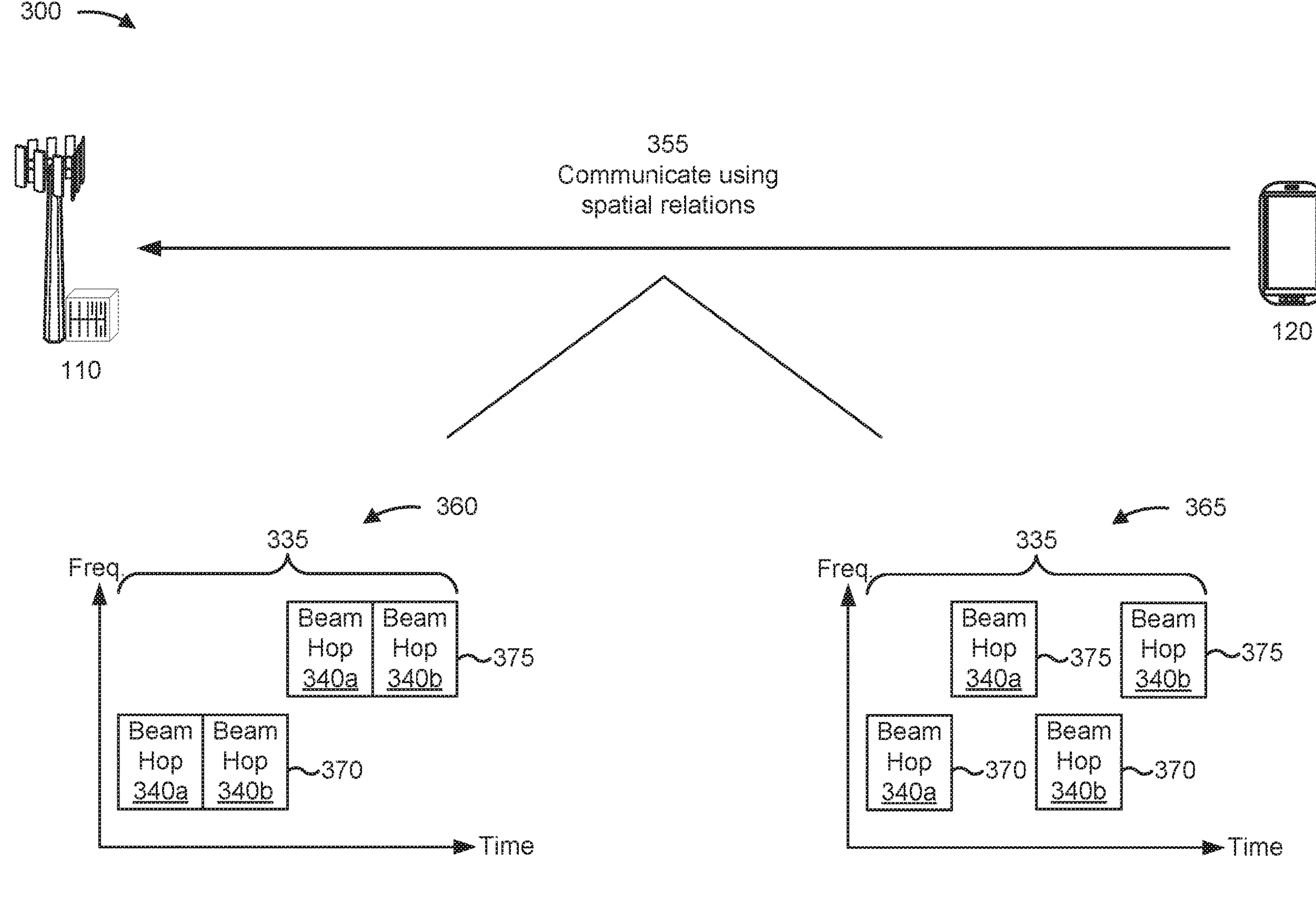

FIGS. 3A-3C are diagrams illustrating one or more examples 300 of beam hopping within a single PUCCH resource, in accordance with various aspects of the present disclosure. As shown in FIGS. 3A-3C, a BS 110 and a UE 120 may communicate with one another.

As shown in FIG. 3A, and by reference number 305, the BS 110 may transmit, and the UE 120 may receive, an activation command to activate multiple (e.g., two) spatial relations for a single PUCCH resource (e.g., PUCCH resource 335, as described in connection with FIG. 3B). That is, the BS 110 may determine, for the UE, multiple spatial relations that are to be activated in a single PUCCH resource, and transmit an activation command to activate the multiple spatial relations. The activation command may be included in a medium access control control element (MAC-CE), such as MAC-CE 310*a* or MAC-CE 310*b*. For example, the MAC-CE may include the activation command by identifying spatial relation identifiers (e.g., PUCCH-SpatialRelationInfoIds) of the multiple spatial relations that are to be activated.

The MAC-CE may also identify the single PUCCH resource, such as by a PUCCH resource identifier, for which the multiple spatial relations are to be activated. A spatial relation (e.g., spatial relation information) may identify a serving cell, a reference signal (e.g., a synchronization signal block (SSB), a channel state information reference signal (CSI-RS), a sounding reference signal (SRS), and/or the like), power control parameters (e.g., a PUCCH pathloss reference signal (PL-RS), a power control offset value (referred to as a P0 parameter), a closed loop index, and/or the like), and/or the like.

In some aspects, the MAC-CE 310*a* may include a bitmap 315 for spatial relations. Bits (shown as $S_0$-$S_7$) of the bitmap 315 may map to spatial relations configured for the UE 120. For example, a first bit (e.g., $S_0$) of the bitmap 315 maps to a first spatial relation configured for the UE 120, a second bit (e.g., $S_1$) of the bitmap 315 maps to a second spatial relation configured for the UE 120, and so forth. In this example, multiple bits (e.g., two bits) of the bitmap 315 may be set to indicate the spatial relations that are to be activated (e.g., according to the mapping of bits to spatial relations). A bit that is set may have a value of one, and a bit that is not set may have a value of zero.

In some aspects, the MAC-CE 310*b* may include multiple fields to indicate the multiple spatial relations. For example, the MAC-CE 310*b* may include a first field 320*a* to indicate a first spatial relation that is to be activated and a second field 320*b* to indicate a second spatial relation that is to be activated. In some aspects, the MAC-CE 310*b* may include additional fields to indicate additional spatial relations that are to be activated. In some aspects, the MAC-CE 310*b* may include a flag 325 to indicate whether the second field 320*b* is present in the MAC-CE 310*b*. For example, the flag 325 may be set (e.g., to a value of one) to indicate that the second field 320*b* is present in the MAC-CE 310*b*.

The activated spatial relations may be associated with beam hops in the single PUCCH resource. For example, a first activated spatial relation indicates a first beam hop (e.g., beam hop 340*a*, as described in connection with FIG. 3B) in the single PUCCH resource, a second activated spatial relation indicates a second beam hop (e.g., beam hop 340*b*, as described in connection with FIG. 3B) in the single PUCCH resource, and so forth. A beam hop may refer to a particular portion (e.g., a time domain portion) of the single PUCCH resource in which the UE 120 is to use a particular beam for communication.

As shown in FIG. 3B, and by reference number 330, the UE 120 may perform processing in connection with the activated spatial relations. In some aspects, the UE 120 may determine a resource allocation of the single PUCCH resource 335 for the beam hops indicated by the activated spatial relations. For example, a first beam hop 340*a*, indicated by a first activated spatial relation, may use a first portion of symbols allocated to the single PUCCH resource 335, and a second beam hop 340*b*, indicated by a second activated spatial relation, may use a second portion of symbols allocated to the single PUCCH resource 335. As an example, the single PUCCH resource 335 may be allocated N symbols, the first portion of the N symbols may be $$\left\lfloor \frac{N}{2} \right\rfloor$$

symbols, and the second portion of the N symbols may be $$N - \left\lceil \frac{N}{2} \right\rceil$$

symbols. In some aspects, the first portion of the symbols and the second portion of the symbols are separated by a gap of at least one symbol.

In some aspects, the UE 120 may determine that the first beam hop 340*a* is to use the same spatial domain filter that the UE 120 used for reception of a reference signal (e.g., an SSB, a CSI-RS, and/or the like), or transmission of a reference signal (e.g., an SRS), indicated by the first activated spatial relation, and that the second beam hop 340*b* is to use the same spatial domain filter that the UE 120 used for reception of a reference signal, or transmission of a reference signal, indicated by the second activated spatial relation. In some aspects, the UE 120 may determine that the first beam hop 340*a* is to use a first set of power control parameters (e.g., a pathloss reference signal (PL-RS), a P0 parameter, a closed loop index, and/or the like) indicated by the first activated spatial relation, and that the second beam hop 340*b* is to use a second set of power control parameters indicated by the second activated spatial relation.

In some aspects, the UE 120 may apply a time domain orthogonal cover code (OCC) over uplink control information (UCI) symbols (e.g., for sequence modulation) and/or demodulation reference signal (DMRS) symbols (e.g., for sequence generation) of the single PUCCH resource 335 per beam hop. In other words, the time domain OCC may be respectively applied to symbols of the first beam hop 340*a* and the second beam hop 340*b*. In some aspects, the UE 120 may separately apply the time domain OCC to the beam hops when the single PUCCH resource 335 is allocated one or two UCI bits for some PUCCH formats (e.g., the single PUCCH resource 335 is in PUCCH format 1).

In some aspects, the UE 120 may determine a first quantity of DMRS symbols, and locations of the DMRS symbols, in the first beam hop 340*a* of the single PUCCH resource 335, and a second quantity of DMRS symbols, and locations of the DMRS symbols, in the second beam hop 340*b* of the single PUCCH resource 335. In some aspects, the UE 120 may separately determine DMRS quantities and locations for the beam hops when the single PUCCH resource 335 is allocated more than two UCI bits for some PUCCH formats (e.g., the single PUCCH resource 335 is in PUCCH format 3 or PUCCH format 4). In some aspects, the first DMRS quantity and locations and the second DMRS quantity and locations may be based at least in part on lengths of the first beam hop 340*a* and the second beam hop 340*b*, respectively. For example, the UE 120 may be configured (e.g., by radio resource control (RRC) configuration) with a mapping that identifies DMRS quantities and locations for different beam hop lengths.

In some aspects, the UE 120 may perform a first rate matching operation and/or resource element (RE) mapping operation for the first beam hop 340*a*, and a second rate matching operation and/or RE mapping operation for the second beam hop 340*b*. In some aspects, the UE 120 may separately perform the rate matching operations and/or RE mapping operations when the single PUCCH resource 335 is allocated more than two UCI bits (e.g., the single PUCCH resource 335 is in PUCCH format 2, PUCCH format 3, or PUCCH format 4). In some aspects, the UE 120 may determine information bits 345 that are to be processed with a rate matching operation, a RE matching operation, and/or the like. The information bits 345 may be a payload (e.g., UCI) that is to be transmitted by the UE 120. The UE 120 may encode the information bits 345 (e.g., using polar encoding or encoding for small block length), and determine a rate matching output sequence based at least in part on the encoded bits, as described below.

The UE 120 may determine a first rate matching output sequence length for the first beam hop 340*a*, based at least in part on resources (e.g., REs) in the first beam hop 340*a* that are available for UCI (e.g., excluding resources that are to be used for DMRSs), and a second rate matching output sequence length for the second beam hop 340*b* based at least in part on resources in the second beam hop 340*b* that are available for UCI. The UE 120 may perform a first rate matching operation 350*a* for the information bits 345 (e.g., coded information bits 345) according to the first rate matching output sequence length that is determined, and a second rate matching operation 350*b* of the information bits 345 (e.g., coded information bits 345) according to the second rate matching output sequence length that is determined.

Moreover, the UE 120 may perform a first RE mapping operation for the first beam hop 340*a* using the output sequence of the first rate matching operation 350*a* (e.g., modulated symbols, corresponding to the output sequence of the first rate matching operation 350*a* are mapped to resources of the first beam hop 340*a*), and a second RE mapping operation for the second beam hop 340*b* using the output sequence of the second rate matching operation 350*b* (e.g., modulated symbols, corresponding to the output sequence of the second rate matching operation 350*b* are mapped to resources of the second beam hop 340*b*). In this way, performance of the PUCCH may be improved, particularly when the first beam hop 340*a* and the second beam hop 340*b* are transmitted to different receivers.

In some aspects, the UE 120 may determine a first PUCCH power value that is to be used for the first beam hop 340*a*, and a second PUCCH power value that is to be used for the second beam hop 340*b*. In some aspects, the UE 120 may determine a PUCCH power value according to Equation 1 (as detailed in 3GPP Technical Specification 38.213, Section 7.2.1):

Equation 1

$$P_{PUCCH,b,f,c}(i,q_u,q_d,l) = \min\left\{\begin{array}{l} P_{CMAX,f,c}(i), \\ P_{0\_PUCCH,b,f,c}(q_u) + 10\log_{10}\left(2^{\mu}\cdot M_{RB,b,f,c}^{PUCCH}(i)\right) \\ +PL_{b,f,c}(q_d) + \Delta_{F\_PUCCH}(F) + \Delta_{TF,b,f,c}(i) + g_{b,f,c}(i,l) \end{array}\right\} \text{ [dBm]}$$

The UE 120 may determine the first PUCCH power value for the first beam hop 340*a* based at least in part of power control parameters (e.g., a PL-RS, a P0 parameter, and/or a closed loop index) indicated by the first spatial relation, and a second PUCCH power value for the second beam hop 340*b* based at least in part on power control parameters indicated by the second spatial relation.

In some aspects, respective closed loop indices indicated by the first spatial relation and the second spatial relation may be different. In this case, to determine the first PUCCH power value, the UE 120 may determine a first transmit power control (TPC) accumulation function value (i.e., $g_{b,f,c}$(i,l)) based at least in part on a first closed loop index indicated by the first spatial relation. To determine the second PUCCH power value, the UE 120 may determine a second TPC accumulation function value based at least in part on a second closed loop index indicated by the second spatial relation.

Moreover, downlink control information (DCI), that schedules a physical downlink shared channel (PDSCH) communication and a transmission of UCI (e.g., acknowledgment feedback for the PDSCH communication) in the single PUCCH resource 335, may indicate a TPC command (e.g., a value from 0 to 3). The TPC command may map to a particular power adjustment that is to be used for determining a TPC accumulation function value. Accordingly, the UE 120 may apply the TPC command to the first closed loop index (when determining the first TPC accumulation function value), the second closed loop index (when determining the second TPC accumulation function value), or both the first and second closed loop indices (when determining the first and second TPC accumulation function values). In some aspects, the DCI may indicate respective TPC commands for the first closed loop index and the second closed loop index, and the UE 120 may determine the first and second TPC accumulation function values based at least in part on the respective TPC commands. For example, multiple TPC commands may be indicated in respective TPC fields of the DCI, or a single TPC field of the DCI may indicate the multiple TPC commands.

In some aspects, such as when the UE 120 performs separate rate matching operations and RE mapping operations for the first beam hop 340*a* and the second beam hop 340*b* (e.g., when the single PUCCH resource 335 is in PUCCH format 2, PUCCH format 3, or PUCCH format 4), a quantity of REs that are mapped and/or a quantity of symbols that carry UCI may be different for the first beam hop 340*a* and the second beam hop 340*b*. This may affect the $\Delta_{TF,b,f,c}$(i) parameter of Equation 1. In this case, to determine the first PUCCH power value, the UE 120 may determine a first quantity of REs and/or a first quantity of symbols (e.g., used for UCI) for the first beam hop 340*a*.

To determine the second PUCCH power value, the UE 120 may determine a second quantity of REs and/or a second quantity of symbols for the second beam hop 340*b*.

As shown in FIG. 3C, and by reference number 355, the UE 120 may communicate in the single PUCCH resource 335 using the multiple spatial relations. For example, the UE 120 may transmit, and the BS 110 may receive, a PUCCH communication (e.g., UCI, such as hybrid automatic repeat request acknowledgment (HARQ-ACK) feedback, channel state information, and/or the like) in the first beam hop 340*a* and the second beam hop 340*b*. In some aspects, the UE 120 may transmit the PUCCH communication using a first beam (as indicated by the first activated spatial relation) in the first beam hop 340*a* and using a second beam (as indicated by the second activated spatial relation) in the second beam hop 340*b*. In some aspects, the PUCCH communication in the first beam hop 340*a* may be received by a first receiver (e.g., a first antenna, panel, TRP, BS, and/or the like), and the PUCCH communication in the second beam hop 340*b* may be received by a second receiver (e.g., a second antenna, panel, TRP, BS, and/or the like).

In some aspects, the UE 120 may begin to communicate using beam hopping upon receiving the MAC-CE (e.g., MAC-CE 310*a* or MAC-CE 310*b*) that includes the activation command for multiple spatial relations. For example, the UE 120 may apply the activation command after a time window (e.g., 3 milliseconds) after the UE 120 transmits acknowledgment feedback (e.g., HARQ-ACK feedback) for the PDSCH carrying the MAC-CE. Additionally, or alternatively, the UE 120 may begin to communicate using beam hopping upon receiving a configuration (e.g., an RRC configuration) for multiple beam hopping for the single PUCCH resource 335 (e.g., an RRC parameter intraSlotBeamHopping is enabled).

In some aspects, the UE 120 may communicate using beam hopping and frequency hopping (e.g., when an RRC parameter intraSlotFrequencyHopping is enabled for the single PUCCH resource 335). For example, the first beam hop 340*a* may use a first frequency hop and a second frequency hop, and the second beam hop 340*b* may use a first frequency hop and a second frequency hop. In this case, the UE 120 may apply a time domain OCC over UCI symbols (e.g., for sequence modulation) and/or DMRS symbols (e.g., for sequence generation) of the single PUCCH resource 335 per beam hop and per frequency hop. In other words, the time domain OCC may be respectively applied to symbols of the first beam hop 340*a* using the first frequency hop, the first beam hop 340*a* using the second frequency hop, the second beam hop 340*b* using the first frequency hop, and the second beam hop 340*b* using the second frequency hop.

As shown by reference numbers 360 and 365, the first portion of the symbols of the single PUCCH resource 335 (e.g., used for the first beam hop 340*a*) is divided into multiple segments, and the second portion of the symbols of the single PUCCH resource 335 (e.g., used for the second beam hop 340*b*) is divided into multiple segments. For example, the single PUCCH resource 335 (allocated N symbols, as described above) is divided into four segments. In this case, a segment may have a length of $$\left\lfloor \frac{N}{4} \right\rfloor \text{ or } \left\lceil \frac{N}{4} \right\rceil$$

symbols. Moreover, a segment may include a single DMRS symbol (e.g., a first symbol of the segment is a DMRS symbol). In some aspects, the single PUCCH resource 335 is divided into segments when the single PUCCH resource 335 is configured with at least eight symbols (e.g., the single PUCCH resource 335 is in PUCCH format 1, PUCCH format 3, or PUCCH format 4).

As shown by reference number 360, the UE 120 may communicate using respective beam hops within multiple frequency hops. For example, in a first frequency hop 370, the UE 120 may employ beam hopping using the first beam hop 340*a* and the second beam hop 340*b*. Continuing with the previous example, in a second frequency hop 375, the UE 120 also may employ beam hopping using the first beam hop 340*a* and the second beam hop 340*b*. Thus, as shown, the symbols for the first frequency hop 370 may be consecutive symbols of the single PUCCH resource 335, and the symbols for the second frequency hop 375 may be consecutive symbols of the single PUCCH resource 335. In some aspects, the UE 120 may receive (e.g., from BS 110) a configuration (e.g., an RRC configuration) that configures the UE 120 for communicating using respective beam hops within multiple frequency hops.

As shown by reference number 365, the UE 120 may communicate using respective frequency hops within multiple beam hops. For example, in the first beam hop 340*a*, the UE 120 may employ frequency hopping using the first frequency hop 370 and the second frequency hop 375. Continuing with the previous example, in the second beam hop 340*b*, the UE 120 also may employ frequency hopping using the first frequency hop 370 and the second frequency hop 375. Thus, as shown, the symbols for the first beam hop 340*a* may be consecutive symbols of the single PUCCH resource 335, and the symbols for the second beam hop 340*b* may be consecutive symbols of the single PUCCH resource 335. In some aspects, the UE 120 may receive (e.g., from BS 110) a configuration (e.g., an RRC configuration) that configures the UE 120 for communicating using respective frequency hops within multiple beam hops.

In this way, the UE 120 may communicate according to multiple spatial relations in a single PUCCH resource 335. This may improve throughput, reliability, performance, and/or the like, of communications of the UE 120.

As indicated above, FIGS. 3A-3C are provided as one or more examples. Other examples may differ from what is described with respect to FIGS. 3A-3C.

Figure 4:
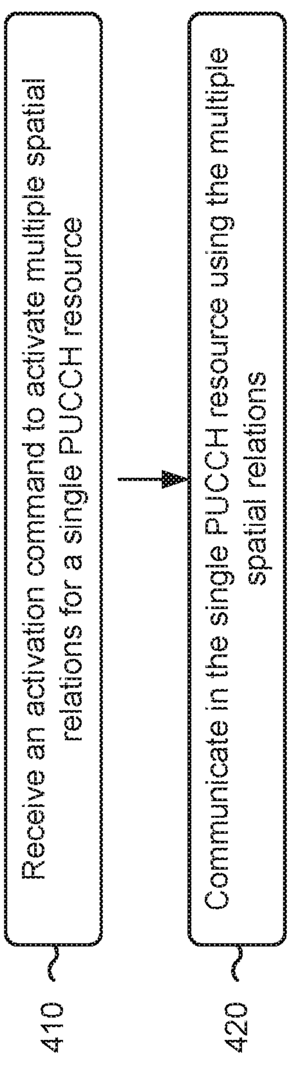
FIG. 4 is a diagram illustrating an example process performed, for example, by a UE, in accordance with various aspects of the present disclosure.
Figure 4:

FIG. 4 is a diagram illustrating an example process 400 performed, for example, by a UE, in accordance with various aspects of the present disclosure. Example process 400 is an example where the UE (e.g., UE 120, and/or the like) performs operations associated with beam hopping within a single PUCCH resource.

As shown in FIG. 4, in some aspects, process 400 may include receiving an activation command to activate multiple spatial relations for a single PUCCH resource (block 410). For example, the UE (e.g., using antenna 252, DEMOD 254, MIMO detector 256, receive processor 258, controller/processor 280, and/or the like) may receive an activation command to activate multiple spatial relations for a single PUCCH resource, as described above.

As further shown in FIG. 4, in some aspects, process 400 may include communicating in the single PUCCH resource using the multiple spatial relations (block 420). For example, the UE (e.g., using controller/processor 280, transmit processor 264, TX MIMO processor 266, MOD 254, antenna 252, and/or the like) may communicate in the single PUCCH resource using the multiple spatial relations, as described above.

Process 400 may include additional aspects, such as any single aspect or any combination of aspects described below and/or in connection with one or more other processes described elsewhere herein.

In a first aspect, the activation command is received via a MAC-CE.

In a second aspect, alone or in combination with the first aspect, the MAC-CE includes a bitmap for spatial relations, and multiple bits of the bitmap are set to indicate the multiple spatial relations that are to be activated.

In a third aspect, alone or in combination with one or more of the first and second aspects, the MAC-CE includes a first field that indicates a first spatial relation that is to be activated, and a second field that indicates a second spatial relation that is to be activated.

In a fourth aspect, alone or in combination with one or more of the first through third aspects, the MAC-CE includes a flag that is set when the second field is included in the MAC-CE.

In a fifth aspect, alone or in combination with one or more of the first through fourth aspects, the UE is to communicate in the single PUCCH resource when a MAC-CE indicating the activation command to activate the multiple spatial relations is received, or a configuration for multiple beam hopping for the single PUCCH resource is received via RRC signaling.

In a sixth aspect, alone or in combination with one or more of the first through fifth aspects, a first spatial relation, of the multiple spatial relations, is associated with a first beam hop in the single PUCCH resource, and a second spatial relation, of the multiple spatial relations, is associated with a second beam hop in the single PUCCH resource, and the first beam hop is to use a first portion of symbols allocated to the single PUCCH resource, and the second beam hop is to use a second portion of the symbols allocated to the single PUCCH resource.

In a seventh aspect, alone or in combination with one or more of the first through sixth aspects, the first beam hop is to use a spatial domain filter used for reception or transmission of a reference signal indicated by the first spatial relation, and the second beam hop is to use a spatial domain filter used for reception or transmission of a reference signal indicated by the second spatial relation.

In an eighth aspect, alone or in combination with one or more of the first through seventh aspects, the first beam hop is to use a first set of power control parameters indicated by the first spatial relation, and the second beam hop is to use a second set of power control parameters indicated by the second spatial relation.

In a ninth aspect, alone or in combination with one or more of the first through eighth aspects, a time domain OCC is to be respectively applied to beam hops.

In a tenth aspect, alone or in combination with one or more of the first through ninth aspects, the first beam hop and the second beam hop are to use respective DMRS symbol quantities and locations in the single PUCCH resource.

In an eleventh aspect, alone or in combination with one or more of the first through tenth aspects, the first portion of the symbols and the second portion of the symbols are separated by a gap of at least one symbol.

In a twelfth aspect, alone or in combination with one or more of the first through eleventh aspects, the first beam hop and the second beam hop are to use respective rate matching operations and RE mapping operations.

In a thirteenth aspect, alone or in combination with one or more of the first through twelfth aspects, a first rate matching output sequence length for the first beam hop is based at least in part on available resources for UCI in the first beam hop, and a second rate matching output sequence length for the second beam hop is based at least in part on available resources UCI in the second beam hop.

In a fourteenth aspect, alone or in combination with one or more of the first through thirteenth aspects, RE mapping for the first beam hop includes mapping modulated symbols, corresponding to a first rate matching output sequence for the first beam hop, to the available resources of the first beam hop, and RE mapping for the second beam hop includes mapping modulated symbols, corresponding to a second rate matching output sequence for the second beam hop, to the available resources of the second beam hop.

In a fifteenth aspect, alone or in combination with one or more of the first through fourteenth aspects, the first beam hop uses a first PUCCH power value and the second beam hop uses a second PUCCH power value.

In a sixteenth aspect, alone or in combination with one or more of the first through fifteenth aspects, the first PUCCH power value is based at least in part on at least one of a first PL-RS, a first offset value, or a first closed loop index, and the second PUCCH power value is based at least in part on at least one of a second PL-RS, a second offset value, or a second closed loop index.

In a seventeenth aspect, alone or in combination with one or more of the first through sixteenth aspects, the first PUCCH power value is based at least in part on a first TPC accumulation function value, and the second PUCCH power value is based at least in part on a second TPC accumulation function value, when respective closed loop index values indicated by the first spatial relation and the second spatial relation are different.

In an eighteenth aspect, alone or in combination with one or more of the first through seventeenth aspects, the first PUCCH power value is based at least in part on at least one of a first quantity of resource elements or a first quantity of symbols, and the second PUCCH power value is based at least in part on at least one of a second quantity of resource elements or a second quantity of symbols.

In a nineteenth aspect, alone or in combination with one or more of the first through eighteenth aspects, respective closed loop index values indicated by the first spatial relation and the second spatial relation are different, and a TPC command indicated for the single PUCCH resource is applied to the respective closed loop index values, the TPC command indicated for the single PUCCH resource is applied to one of the respective closed loop index values, or respective TPC commands are indicated for the respective closed loop index values.

In a twentieth aspect, alone or in combination with one or more of the first through nineteenth aspects, the first beam hop is to use a first frequency hop and a second frequency hop of the single PUCCH resource, and the second beam hop is to use the first frequency hop and the second frequency hop.

In a twenty first aspect, alone or in combination with one or more of the first through twentieth aspects, the first frequency hop includes consecutive symbols of the single PUCCH resource, and the second frequency hop includes consecutive symbols of the single PUCCH resource.

In a twenty second aspect, alone or in combination with one or more of the first through twenty first aspects, the first beam hop includes consecutive symbols of the single PUCCH resource, and the second beam hop includes consecutive symbols of the single PUCCH resource.

In a twenty third aspect, alone or in combination with one or more of the first through twenty second aspects, a frequency hopping pattern for the first beam hop and the second beam hop is indicated via RRC signaling.

In a twenty fourth aspect, alone or in combination with one or more of the first through twenty third aspects, a time domain OCC is to be respectively applied to beam hops and frequency hops.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
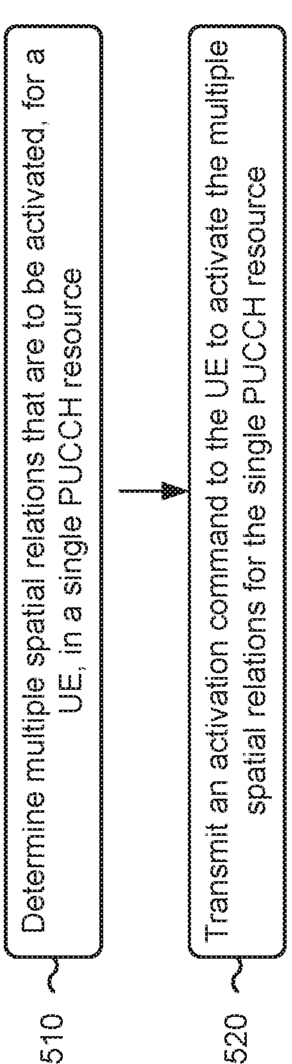
FIG. 5 is a diagram illustrating an example process performed, for example, by a BS, in accordance with various aspects of the present disclosure.
Figure 5:

FIG. 5 is a diagram illustrating an example process 500 performed, for example, by a BS, in accordance with various aspects of the present disclosure. Example process 500 is an example where the BS (e.g., BS 110, and/or the like) performs operations associated with beam hopping within a single PUCCH resource.

As shown in FIG. 5, in some aspects, process 500 may include determining multiple spatial relations that are to be activated, for a UE, in a single PUCCH resource (block 510). For example, the BS (e.g., using controller/processor 240, and/or the like) may determine multiple spatial relations that are to be activated, for a UE, in a single PUCCH resource, as described above.

As further shown in FIG. 5, in some aspects, process 500 may include transmitting an activation command to the UE to activate the multiple spatial relations for the single PUCCH resource (block 520). For example, the BS (e.g., using controller/processor 240, transmit processor 220, TX MIMO processor 230, MOD 232, antenna 234, and/or the like) may transmit an activation command to the UE to activate the multiple spatial relations for the single PUCCH resource, as described above.

Process 500 may include additional aspects, such as any single aspect or any combination of aspects described below and/or in connection with one or more other processes described elsewhere herein.

In a first aspect, the activation command is transmitted via a MAC-CE.

In a second aspect, alone or in combination with the first aspect, the MAC-CE includes a bitmap for spatial relations, and multiple bits of the bitmap are set to indicate the multiple spatial relations that are to be activated.

In a third aspect, alone or in combination with one or more of the first and second aspects, the MAC-CE includes a first field that indicates a first spatial relation that is to be activated, and a second field that indicates a second spatial relation that is to be activated.

In a fourth aspect, alone or in combination with one or more of the first through third aspects, the MAC-CE includes a flag that is set when the second field is included in the MAC-CE.

In a fifth aspect, alone or in combination with one or more of the first through fourth aspects, the UE is to communicate in the single PUCCH resource when a MAC-CE indicating the activation command to activate the multiple spatial relations is received by the UE, or a configuration for multiple beam hopping for the single PUCCH resource is received by the UE via RRC signaling.

In a sixth aspect, alone or in combination with one or more of the first through fifth aspects, a first spatial relation, of the multiple spatial relations, is associated with a first beam hop in the single PUCCH resource, and a second spatial relation, of the multiple spatial relations, is associated with a second beam hop in the single PUCCH resource, and the first beam hop is to use a first portion of symbols allocated to the single PUCCH resource, and the second beam hop is to use a second portion of the symbols allocated to the single PUCCH resource.

In a seventh aspect, alone or in combination with one or more of the first through sixth aspects, the first beam hop is to use a spatial domain filter used for reception or transmission of a reference signal indicated by the first spatial relation, and the second beam hop is to use a spatial domain filter used for reception or transmission of a reference signal indicated by the second spatial relation.

In an eighth aspect, alone or in combination with one or more of the first through seventh aspects, the first beam hop is to use a first set of power control parameters indicated by the first spatial relation, and the second beam hop is to use a second set of power control parameters indicated by the second spatial relation.

In a ninth aspect, alone or in combination with one or more of the first through eighth aspects, a time domain OCC is to be respectively applied to beam hops.

In a tenth aspect, alone or in combination with one or more of the first through ninth aspects, the first beam hop and the second beam hop are to use respective DMRS symbol quantities and locations in the single PUCCH resource.

In an eleventh aspect, alone or in combination with one or more of the first through tenth aspects, the first portion of the symbols and the second portion of the symbols are separated by a gap of at least one symbol.

In a twelfth aspect, alone or in combination with one or more of the first through eleventh aspects, the first beam hop and the second beam hop are to use respective rate matching operations and RE mapping operations.

In a thirteenth aspect, alone or in combination with one or more of the first through twelfth aspects; a first rate matching output sequence length for the first beam hop is based at least in part on available resources for UCI in the first beam hop, and a second rate matching output sequence length for the second beam hop is based at least in part on available resources for UCI in the second beam hop.

In a fourteenth aspect, alone or in combination with one or more of the first through thirteenth aspects, RE mapping for the first beam hop includes mapping modulated symbols, corresponding to a first rate matching output sequence for the first beam hop, to the available resources of the first beam hop, and RE mapping for the second beam hop includes mapping modulated symbols, corresponding to a second rate matching output sequence for the second beam hop, to the available resources of the second beam hop.

In a fifteenth aspect, alone or in combination with one or more of the first through fourteenth aspects, the first beam hop uses a first PUCCH power value and the second beam hop uses a second PUCCH power value.

In a sixteenth aspect, alone or in combination with one or more of the first through fifteenth aspects, the first PUCCH power value is based at least in part on at least one of a first PL-RS, a first offset value, or a first closed loop index, and the second PUCCH power value is based at least in part on at least one of a second PL-RS, a second offset value, or a second closed loop index.

In a seventeenth aspect, alone or in combination with one or more of the first through sixteenth aspects, the first PUCCH power value is based at least in part on a first TPC accumulation function value, and the second PUCCH power value is based at least in part on a second TPC accumulation function value, when respective closed loop index values indicated by the first spatial relation and the second spatial relation are different.

In an eighteenth aspect, alone or in combination with one or more of the first through seventeenth aspects, the first PUCCH power value is based at least in part on at least one of a first quantity of resource elements or a first quantity of symbols, and the second PUCCH power value is based at least in part on at least one of a second quantity of resource elements or a second quantity of symbols.

In a nineteenth aspect, alone or in combination with one or more of the first through eighteenth aspects, respective closed loop index values indicated by the first spatial relation and the second spatial relation are different, and a TPC command indicated for the single PUCCH resource is to be applied by the UE to the respective closed loop index values, the TPC command indicated for the single PUCCH resource is to be applied by the UE to one of the respective closed loop index values, or respective TPC commands are indicated for the respective closed loop index values.

In a twentieth aspect, alone or in combination with one or more of the first through nineteenth aspects, the first beam hop is to use a first frequency hop and a second frequency hop of the single PUCCH resource, and the second beam hop is to use the first frequency hop and the second frequency hop.

In a twenty first aspect, alone or in combination with one or more of the first through twentieth aspects, the first frequency hop includes consecutive symbols of the single PUCCH resource, and the second frequency hop includes consecutive symbols of the single PUCCH resource.

In a twenty second aspect, alone or in combination with one or more of the first through twenty first aspects, the first beam hop includes consecutive symbols of the single PUCCH resource, and the second beam hop includes consecutive symbols of the single PUCCH resource.

In a twenty third aspect, alone or in combination with one or more of the first through twenty second aspects, a frequency hopping pattern for the first beam hop and the second beam hop is indicated via RRC signaling.

In a twenty fourth aspect, alone or in combination with one or more of the first through twenty third aspects, a time domain OCC is to be respectively applied by the UE to symbols of beam hops and frequency hops.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving, via a medium access control control element (MAC-CE), an activation command to activate multiple spatial relations for a single physical uplink control channel (PUCCH) resource, the activation command comprising:

a PUCCH resource identifier identifying the single PUCCH resource to be activated, a field indicating that information corresponding to a plurality of spatial relation identifiers for the single PUCCH resource is present, and the plurality of spatial relation identifiers; and communicating in the single PUCCH resource using a plurality of beam hops corresponding to the multiple spatial relations, wherein a first beam hop of the plurality of beam hops uses a first transmit power control accumulation function value based at least in part on a first closed loop index indicated by a first spatial relation of the multiple spatial relations, and a second beam hop of the plurality of beam hops uses a second transmit power control accumulation function value based at least in part on a second closed loop index indicated by a second spatial relation of the multiple spatial relations, when the first closed loop index and the second closed loop index are different.

2. The method of claim 1, wherein the MAC-CE includes a first field that indicates a first spatial relation identifier of the plurality of spatial relation identifiers, and a second field that indicates a second spatial relation identifier of the plurality of spatial relation identifiers.

3. The method of claim 1, wherein the UE is to communicate in the single PUCCH resource when the MAC-CE is received.

4. The method of claim 1, wherein a first spatial relation, of the multiple spatial relations, is associated with the first beam hop of the plurality of beam hops, and a second spatial relation, of the multiple spatial relations, is associated with the second beam hop of the plurality of beam hops, and wherein the first beam hop is to use a first portion of symbols allocated to the single PUCCH resource, and the second beam hop is to use a second portion of the symbols allocated to the single PUCCH resource.

5. The method of claim 4, wherein the first beam hop is to use a first set of power control parameters indicated by the first spatial relation, and the second beam hop is to use a second set of power control parameters indicated by the second spatial relation.

6. The method of claim 4, wherein the first beam hop and the second beam hop are to use respective rate matching operations and resource element (RE) mapping operations.

7. The method of claim 6, wherein a first rate matching output sequence length for the first beam hop is based at least in part on available resources for uplink control information in the first beam hop, and a second rate matching output sequence length for the second beam hop is based at least in part on available resources for uplink control information in the second beam hop.

8. The method of claim 7, wherein RE mapping for the first beam hop includes mapping modulated symbols, corresponding to a first rate matching output sequence for the first beam hop, to the available resources of the first beam hop, and RE mapping for the second beam hop includes mapping modulated symbols, corresponding to a second rate matching output sequence for the second beam hop, to the available resources of the second beam hop.

9. The method of claim 4, wherein the first beam hop uses a first PUCCH power value and the second beam hop uses a second PUCCH power value.

10. The method of claim 9, wherein the first PUCCH power value is based at least in part on at least one of a first pathloss reference signal, a first offset value, or a first closed loop index, and the second PUCCH power value is based at least in part on at least one of a second pathloss reference signal, a second offset value, or a second closed loop index.

11. The method of claim 9, wherein the first PUCCH power value is based at least in part on at least one of a first quantity of resource elements or a first quantity of symbols, and the second PUCCH power value is based at least in part on at least one of a second quantity of resource elements or a second quantity of symbols.

12. The method of claim 9, wherein respective closed loop index values indicated by the first spatial relation and the second spatial relation are different, and wherein a transmit power control (TPC) command indicated for the single PUCCH resource is applied to the respective closed loop index values, the TPC command indicated for the single PUCCH resource is applied to one of the respective closed loop index values, or respective TPC commands are indicated for the respective closed loop index values.

13. The method of claim 4, wherein the first beam hop is to use a first frequency hop and a second frequency hop of the single PUCCH resource, and the second beam hop is to use the first frequency hop and the second frequency hop.

14. A method of wireless communication performed by a network entity, comprising:

determining multiple spatial relations that are to be activated, for a user equipment (UE), in a single physical uplink control channel (PUCCH) resource; and transmitting, via a medium access control control element (MAC-CE), an activation command to the UE to activate the multiple spatial relations for use in a plurality of beam hops within a transmission using the single PUCCH resource, wherein a first beam hop of the plurality of beam hops uses a first transmit power control accumulation function value based at least in part on a first closed loop index indicated by a first spatial relation of the multiple spatial relations, and a second beam hop of the plurality of beam hops uses a second transmit power control accumulation function value based at least in part on a second closed loop index indicated by a second spatial relation of the multiple spatial relations, when the first closed loop index and the second closed loop index are different, and wherein the activation command comprises:

a PUCCH resource identifier identifying the single PUCCH resource to be activated, a field indicating that information corresponding to a plurality of spatial relation identifiers for the single PUCCH resource is present, and the plurality of spatial relation identifiers.

15. The method of claim 14, wherein the MAC-CE includes a first field that indicates a first spatial relation identifier of the plurality of spatial relation identifiers, and a second field that indicates a second spatial relation identifier of the plurality of spatial relation identifiers.

16. The method of claim 14, wherein a first spatial relation, of the multiple spatial relations, is associated with the first beam hop of the plurality of beam hops, and a second spatial relation, of the multiple spatial relations, is associated with the second beam hop of the plurality of beam hops, and wherein the first beam hop and the second beam hop correspond to different portions of the transmission.

17. A user equipment (UE) for wireless communication, comprising:

one or more memories; and one or more processors coupled to the one or more memories, the one or more processors configured to:

receive, via a medium access control control element (MAC-CE), an activation command to activate multiple spatial relations for a single physical uplink control channel (PUCCH) resource, the activation command comprising:

a PUCCH resource identifier identifying the single PUCCH resource to be activated, a field indicating that information corresponding to a plurality of spatial relation identifiers for the single PUCCH resource is present, and the plurality of spatial relation identifiers; and communicate in the single PUCCH resource using a plurality of beam hops corresponding to the multiple spatial relations, wherein a first beam hop of the plurality of beam hops uses a first transmit power control accumulation function value based at least in part on a first closed loop index indicated by a first spatial relation of the multiple spatial relations, and a second beam hop of the plurality of beam hops uses a second transmit power control accumulation function value based at least in part on a second closed loop index indicated by a second spatial relation of the multiple spatial relations, when the first closed loop index and the second closed loop index are different.

18. The UE of claim 17, wherein the MAC-CE includes a first field that indicates a first spatial relation identifier of the plurality of spatial relation identifiers, and a second field that indicates a second spatial relation identifier of the plurality of spatial relation identifiers.

19. The UE of claim 17, wherein the one or more processors, to communicate in the single PUCCH resource, are configured to:

communicate in the single PUCCH resource when the MAC-CE is received.

20. A network entity for wireless communication, comprising:

one or more memories; and one or more processors coupled to the one or more memories, the one or more processors configured to:

determine multiple spatial relations that are to be activated, for a user equipment (UE), in a single physical uplink control channel (PUCCH) resource; and transmit, via a medium access control control element (MAC-CE), an activation command to the UE to activate the multiple spatial relations for use in a plurality of beam hops within a transmission using the single PUCCH resource, wherein a first beam hop of the plurality of beam hops uses a first transmit power control accumulation function value based at least in part on a first closed loop index indicated by a first spatial relation of the multiple spatial relations, and a second beam hop of the plurality of beam hops uses a second transmit power control accumulation function value based at least in part on a second closed loop index indicated by a second spatial relation of the multiple spatial relations, when the first closed loop index and the second closed loop index are different, and wherein the activation command comprises:

a PUCCH resource identifier identifying the single PUCCH resource to be activated, a field indicating that information corresponding to a plurality of spatial relation identifiers for the single PUCCH resource is present, and the plurality of spatial relation identifiers.

21. The network entity of claim 20, wherein the MAC-CE includes a first field that indicates a first spatial relation identifier of the plurality of spatial relation identifiers, and a second field that indicates a second spatial relation identifier of the plurality of spatial relation identifiers.

22. The method of claim 1, wherein a first spatial relation, of the multiple spatial relations, is associated with the first beam hop of the plurality of beam hops in the single PUCCH resource, and a second spatial relation, of the multiple spatial relations, is associated with the second beam hop of the plurality of beam hops in the single PUCCH resource, and wherein the first beam hop corresponds to a first transmit receive point (TRP), and the second beam hop corresponds to a second TRP.

23. The method of claim 1, wherein the activation command comprises a field indicating an identity of a serving cell for which the MAC-CE applies.

24. The method of claim 1, wherein the field is set to one to indicate that the plurality of spatial relation identifiers is present.

25. The method of claim 14, wherein the activation command comprises a field indicating an identity of a serving cell for which the MAC-CE applies.

26. The UE of claim 17, wherein a first spatial relation, of the multiple spatial relations, is associated with the first beam hop of the plurality of beam hops in the single PUCCH resource, and a second spatial relation, of the multiple spatial relations, is associated with the second beam hop of the plurality of beam hops in the single PUCCH resource, and wherein the first beam hop corresponds to a first transmit receive point (TRP), and the second beam hop corresponds to a second TRP.

27. The UE of claim 17, wherein the activation command comprises a field indicating an identity of a serving cell for which the MAC-CE applies.

28. The UE of claim 17, wherein the field is set to one to indicate that the plurality of spatial relation identifiers is present.

29. The network entity of claim 20, wherein the MAC-CE comprises a field indicating an identity of a serving cell for which the MAC-CE applies.

30. The UE of claim 17, wherein a transmit power control (TPC) command indicated for the single PUCCH resource is applied to both the first closed loop index and the second closed loop index.

* * * * *